(12) United States Patent
Shor (10) Patent No.: US 8,200,858 B1
(45) Date of Patent: Jun. 12, 2012

(54) SYSTEM AND A METHOD FOR QUALITY OF SERVICE IN USB AND WUSB ENDPOINTS

(75) Inventor: Gadi Shor, Tel Aviv (IL)

(73) Assignee: Wisair Ltd., Tel Aviv (IL)

( * ) Notice: Subject to any disclaimer, the term of this patent is extended or adjusted under 35 U.S.C. 154(b) by 0 days.

(21) Appl. No.: 12/795,852

(22) Filed: Jun. 8, 2010

Related U.S. Application Data (60) Provisional application No. 61/184,888, filed on Jun. 8, 2009.

(51) Int. Cl.
*G06F 3/00* (2006.01)
*G06F 13/00* (2006.01)

(52) U.S. Cl. ......... 710/39; 710/2; 710/5; 710/8; 710/33; 710/52

(58) Field of Classification Search .................. None
See application file for complete search history.

(56) References Cited

U.S. PATENT DOCUMENTS

| | | | |
|---|---|---|---|
| 2006/0153228 A1* | 7/2006 | Stahl et al. | 370/466 |
| 2006/0271654 A1* | 11/2006 | Lee et al. | 709/221 |
| 2007/0073824 A1* | 3/2007 | Choo et al. | 709/208 |

OTHER PUBLICATIONS

Universal Serial Bus Mass Storage Class, Sep. 31, 1999, USB.org, [online, accessed on Jul. 31, 2011], URL: http://www.usb.org/developers/devclass_docs/usbmassbulk_10.pdf.*

* cited by examiner

*Primary Examiner* — Ilwoo Park
*Assistant Examiner* — Scott Sun
(74) *Attorney, Agent, or Firm* — Reches Patents (57) ABSTRACT

A universal serial bus (USB) communication system, the communication system including: (a) at least one asynchronous transmission queue manager configured to queue, in at least one asynchronous transmission queue, information for asynchronous transmission through at least one asynchronous pipe; (b) at least one guaranteed transmission queue manager configured to insert into at least one queue information for transmission through a dedicated pipe utilized by the communication system; wherein the at least one queue is selected from the at least one asynchronous transmission queue, at least one periodic transmission queue and at least one additional queue; and (c) a transmitter configured to transmit information through the at least one asynchronous pipe and the dedicated pipe, wherein the transmitting through the dedicated pipe is prioritized over the transmitting at the at least one asynchronous pipe, wherein the transmitting at the dedicated pipe is irrespective of time in which information for transmission at the dedicated pipe is inserted into the at least one queue.

22 Claims, 9 Drawing Sheets

Prior art

FIG. 7

SYSTEM AND A METHOD FOR QUALITY OF SERVICE IN USB AND WUSB ENDPOINTS

RELATED APPLICATIONS

This application claims priority from U.S. provisional patent application Ser. No. 61/184,888 filing date Jun. 8, 2009 which is incorporated herein by its entirety.

BACKGROUND OF THE INVENTION

Universal Serial Bus (USB) and Wireless USB (WUSB) are well accepted and widely used standards for computer communication.

USB 2.0 and Wireless USB 1.0 define few endpoint transfer types:
 i. Control Transfers
 ii. Interrupt Data Transfers
 iii. Bulk Data Transfers;
 iv. Isochronous Data Transfers Control Transfers are used to configure a device at attach time and can be used for other device-specific purposes, including control of other pipes on the device. While similar in nature to bulk data transfers, control transfers are intended and constrained for data which is small and infrequent.

Interrupt Data Transfers are used for timely but reliable delivery of data. WUSB also include low-power interrupt which allows devices to sleep and save power, by allowing for a device to not respond for an extended range of time without declaring an error Interrupt transfer type is intended to support devices that want a high reliability method to communicate a small amount of data with a bounded over-the-air service interval. The Wireless USB Interrupt transfer type may provide the following:
 i. Guaranteed maximum service period.
 ii. Guaranteed retries during the service period if delivery failures occur.

It is noted that there is no equivalent in WUSB to wired USB high bandwidth interrupt endpoints and those are not supported by Wireless USB.

Bulk Data Transfers are generated or consumed in relatively large and burst-like quantities and have wide dynamic latitude in transmission constraints. Bulk data transfers have guaranteed delivery, but no quality of service assurance.

In WUSB, bulk transfer type is intended to support devices that want to communicate relatively large amounts of data at highly variable times where the transfer can use any available wireless USB channel bandwidth. A wireless USB Bulk function endpoint provides the following:
 i. Access to the Wireless USB channel on a bandwidth available basis;
 ii. Guaranteed delivery of data, but no guarantee of bandwidth or latency.

Bulk transfers occur only on a bandwidth-available basis. With large amount of channel time and good channel conditions, bulk transfers may happen relatively quickly; for conditions with little channel time available, bulk transfers may take a long time.

A bulk function endpoint has no way to indicate a desired bus access frequency for a bulk pipe. Bulk transactions occur on the Wireless USB channel only on a bandwidth available basis; i.e. if there is wireless USB channel time that is not being used for other purposes, bulk transactions will be moved.

All bulk transfers pending in a system contend for the same available bus time. Because of this, the USB system software at its discretion can vary the bus time made available for bulk transfers to a particular endpoint. An endpoint and its client software cannot assume a specific rate of service for bulk transfers. Bus time made available to a software client and its endpoint can be changed as other devices are inserted into and removed from the system or also as bulk transfers are requested for other function endpoints.

Isochronous Data Transfers occupy a pre-negotiated amount of USB bandwidth with a pre-negotiated delivery latency. This delivers some quality of service (minimal attempts to pass packets each service interval), but no guaranteed delivery (data which becomes obsolete due to channel errors is discarded).

In wireless USB, isochronous transfer type is intended to support streams that want to perform constant rate, error tolerant, periodic transfers with a bounded service interval. The Wireless USB Isochronous transfer type provides the following:
 i. Guaranteed bandwidth for transaction attempts on the wireless USB channel with bounded latency;
 ii. Guaranteed average constant data rate through the pipe as long as data is provided to the pipe (this guarantee is subject to the reliability of the wireless media. The wireless USB isochronous model allows endpoints to operate with reliability similar to wired USB isochronous endpoints under most conditions);
 iii. Guaranteed retries during the service period if delivery failures occur (a minimum of one guaranteed retry per service interval must be provided);
 iv. Additional reliability during short term error bursts by adding delay to the stream. The amount of delay that can be added is a function of the buffering provided by the isochronous endpoint.

In isochronous data transfers data may be discarded by the transmitter under the Wireless USB isochronous protocol. Each isochronous data packet contains an isochronous header that includes a presentation time. Gaps in the presentation time allow the receiver to detect when data has been discarded and how many packets have been discarded. When link conditions degrade for an extended period of time an isochronous transmitter may be required to discard data. The Wireless USB protocol contains mechanisms to provide the receiver with information about the number of discarded packets.

Schedules for a Controller in USB and WUSB Communication:

In EHCI (Enhanced Host Controller Interface Specification) for wired USB (e.g. USB 2.0) and in WHCI (Wireless Host Controller Interface Specification) for wireless USB (e.g. WUSB 1.0), two schedules are defined for the respective controller to schedule air/wire time:
 i. A periodic schedule including isochronous and interrupt endpoints, accessed per service interval; and
 ii. An asynchronous schedule including bulk and control endpoints, accessed in round-robin best effort manner.

Bulk offers guaranteed delivery but no quality of service; isochronous offers quality of service but is geared towards real-time streaming thus does not guarantee delivery.

There is a need to enable applications (e.g. compressed video data) that require guaranteed data delivery in addition to some quality of service.

Figure 1A:
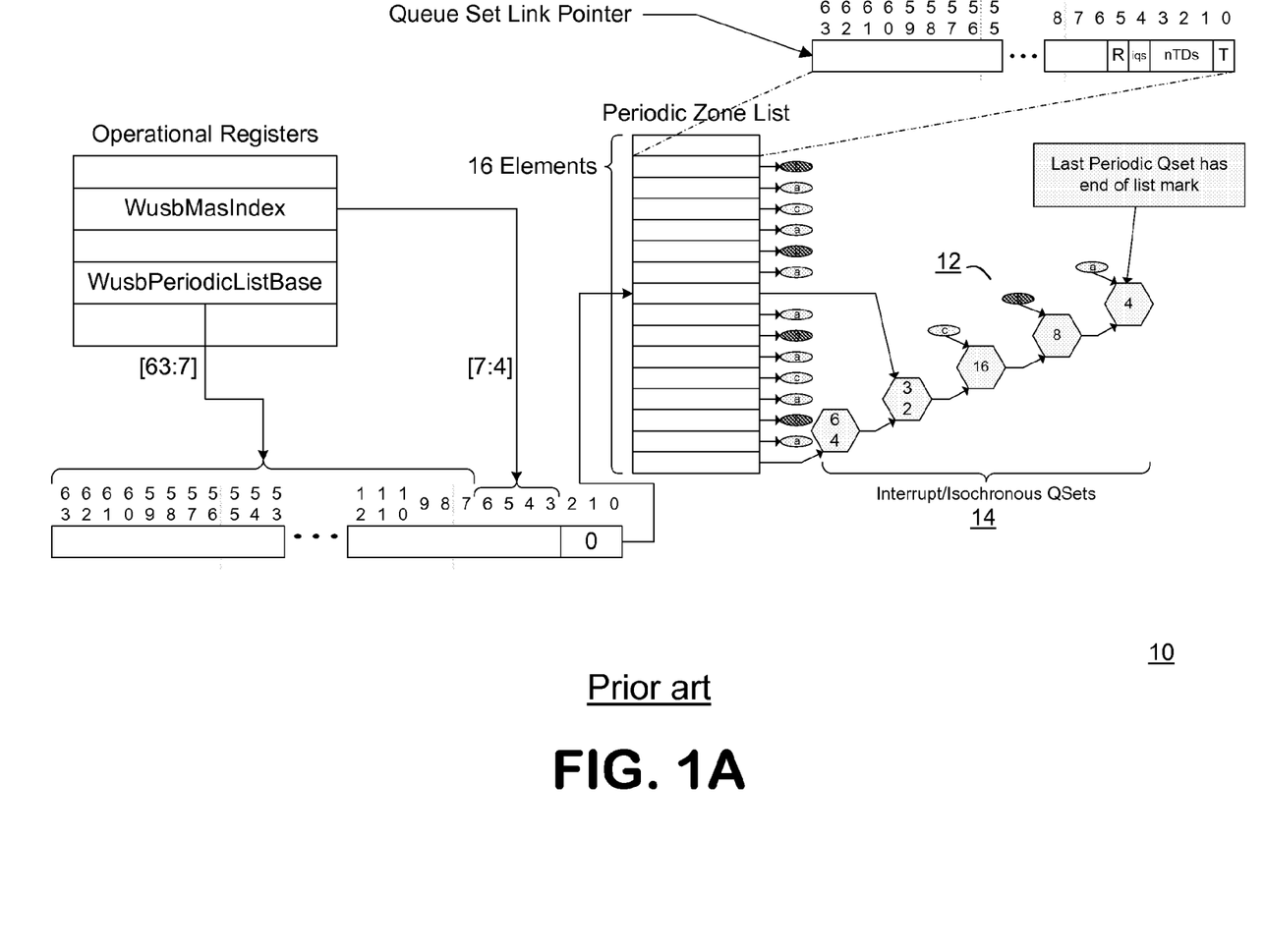
FIG. 1A illustrates prior art example organization of periodic schedule in wireless USB communication.

FIG. 1A illustrates a prior art example organization of periodic schedule 10 in wireless USB communication. The periodic schedule 10 includes at least one prior art periodic transmission queue 12, that includes one or more periodic queue sets 14 (also denoted Qset), such as interrupt Qsets and Isochronous Qsets. Conveniently, each of the QSets may include a QHead and one or more qTD (Queue Element Transfer Descriptor) structures, wherein the QHead contains numerous defined elements, including a pointer to the next QHead.

Figure 1B:
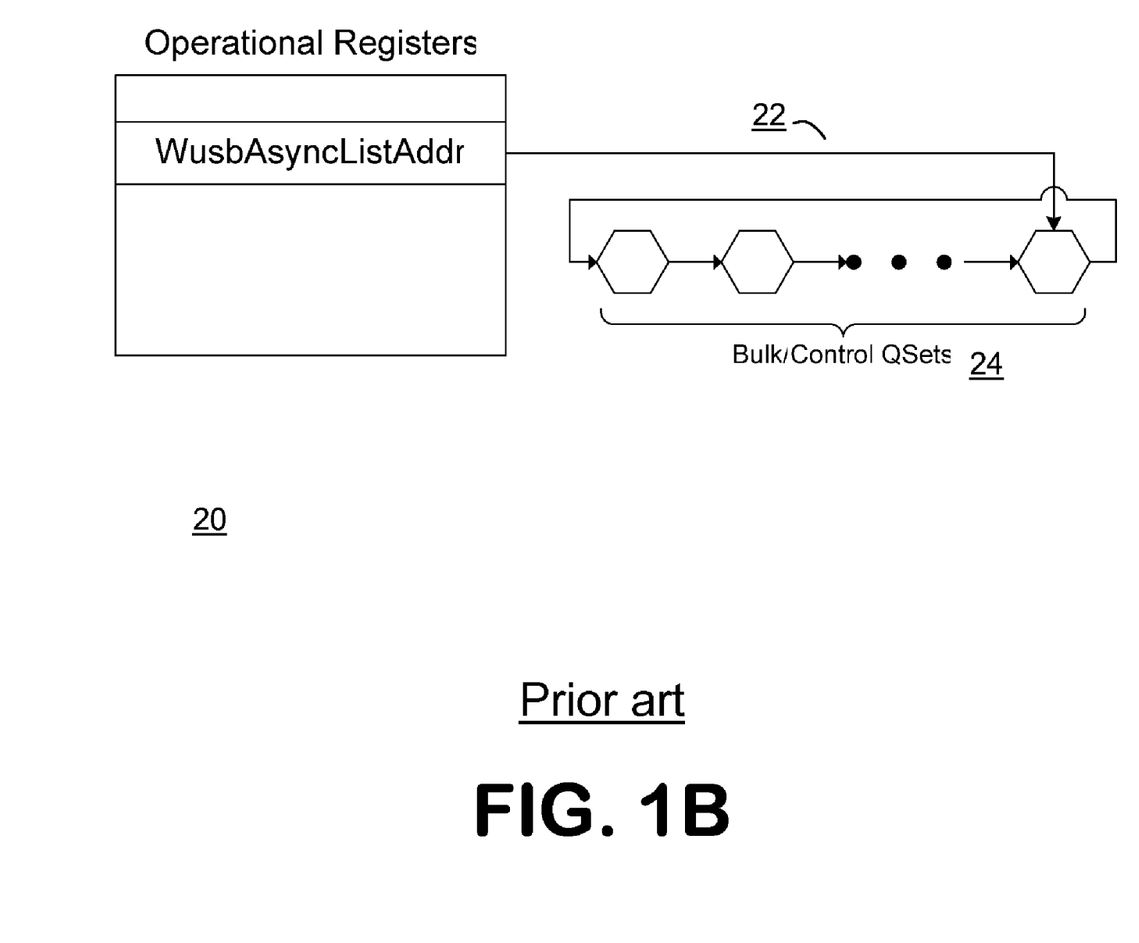
FIG. 1B illustrates prior art example organization of asynchronous schedule in wireless USB communication.

FIG. 1B illustrates prior art example organization of asynchronous schedule 20 in wireless USB communication. The asynchronous schedule 20 includes at least one prior art asynchronous transmission queue 22, that includes one or more periodic queue sets 24 (also denoted Qset), such as Bulk Qsets and Control Qsets. Conveniently, each of the QSets may include a QHead and one or more qTD (Queue Element Transfer Descriptor) structures, wherein the QHead contains numerous defined elements, including a pointer to the next QHead.

Figure 2:
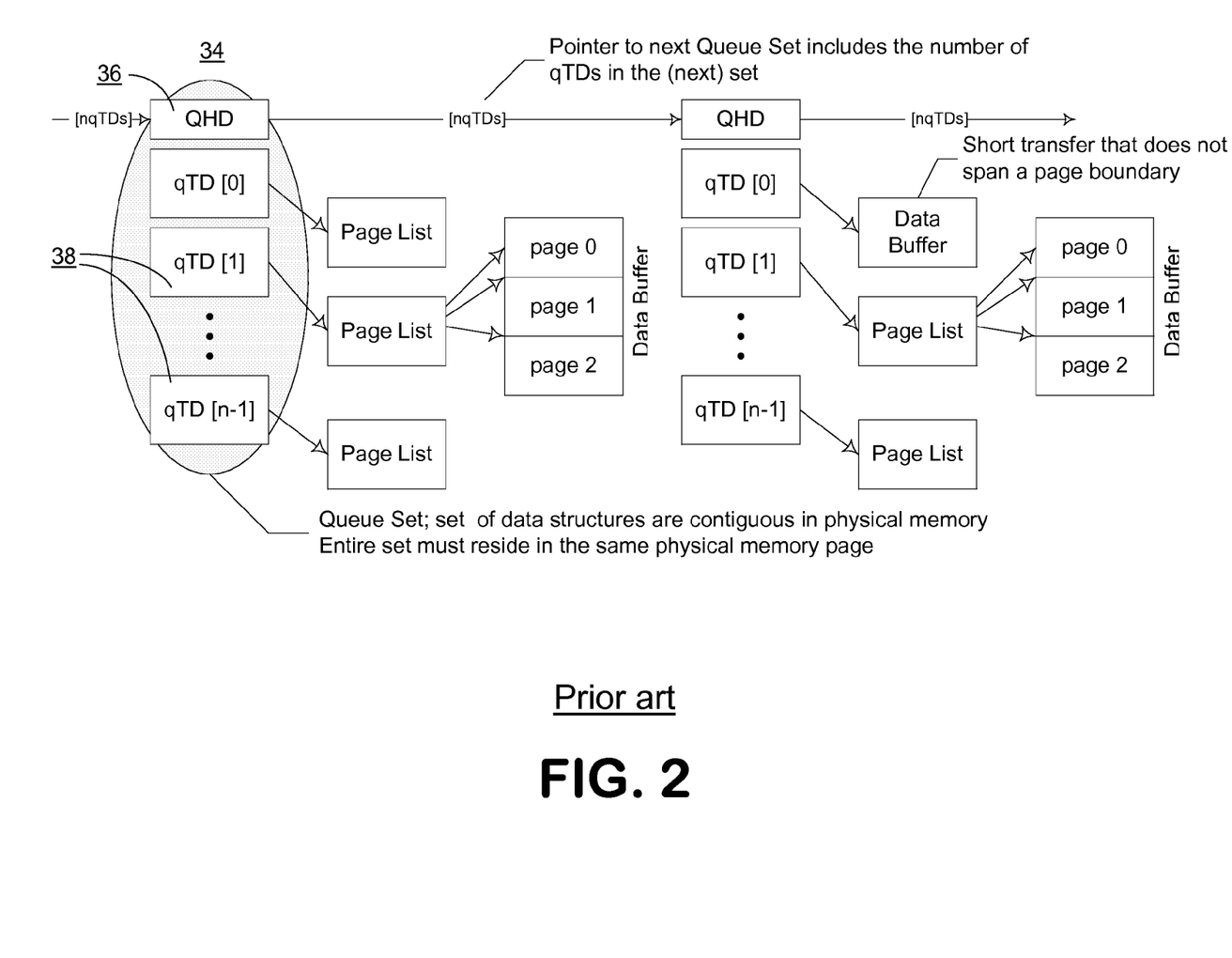
FIG. 2 illustrates prior art organization of interface data structure in wireless USB communication.

FIG. 2 illustrates prior art organization of interface data structure 30 in wireless USB communication. Interface data structure 30 includes, inter alia, various Qsets 34, each of which includes a QHead 36 and one or more queue element transfer descriptors 38.

Figure 3A:
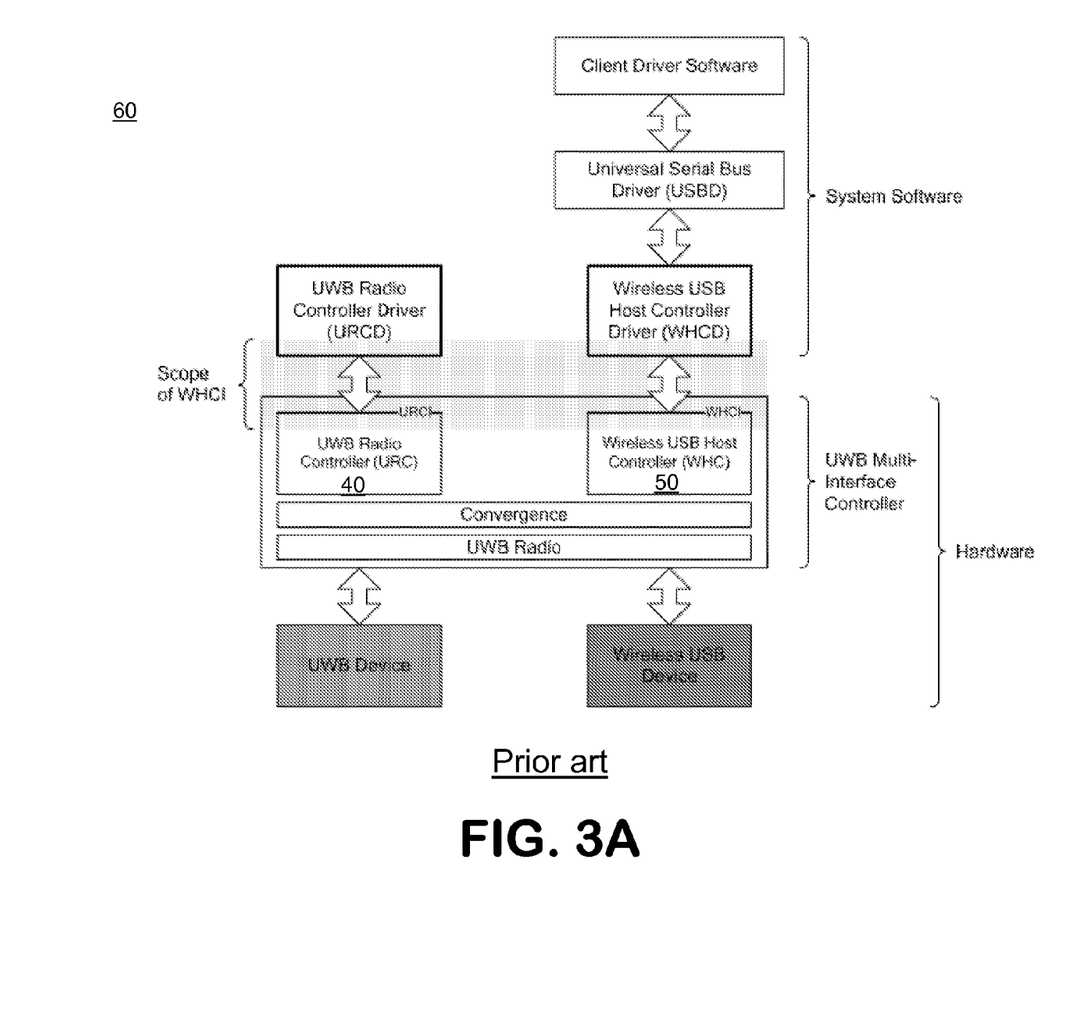
FIG. 3A is a block diagram of a prior art wireless USB system.

FIG. 3A is a block diagram of a prior art wireless USB system 60. Prior art wireless USB system 60 includes, inter alia, ultra wide band (UWB) radio controller (URCI) 40 and wireless USB host controller interface (WHCI) 50.

Figure 3B:
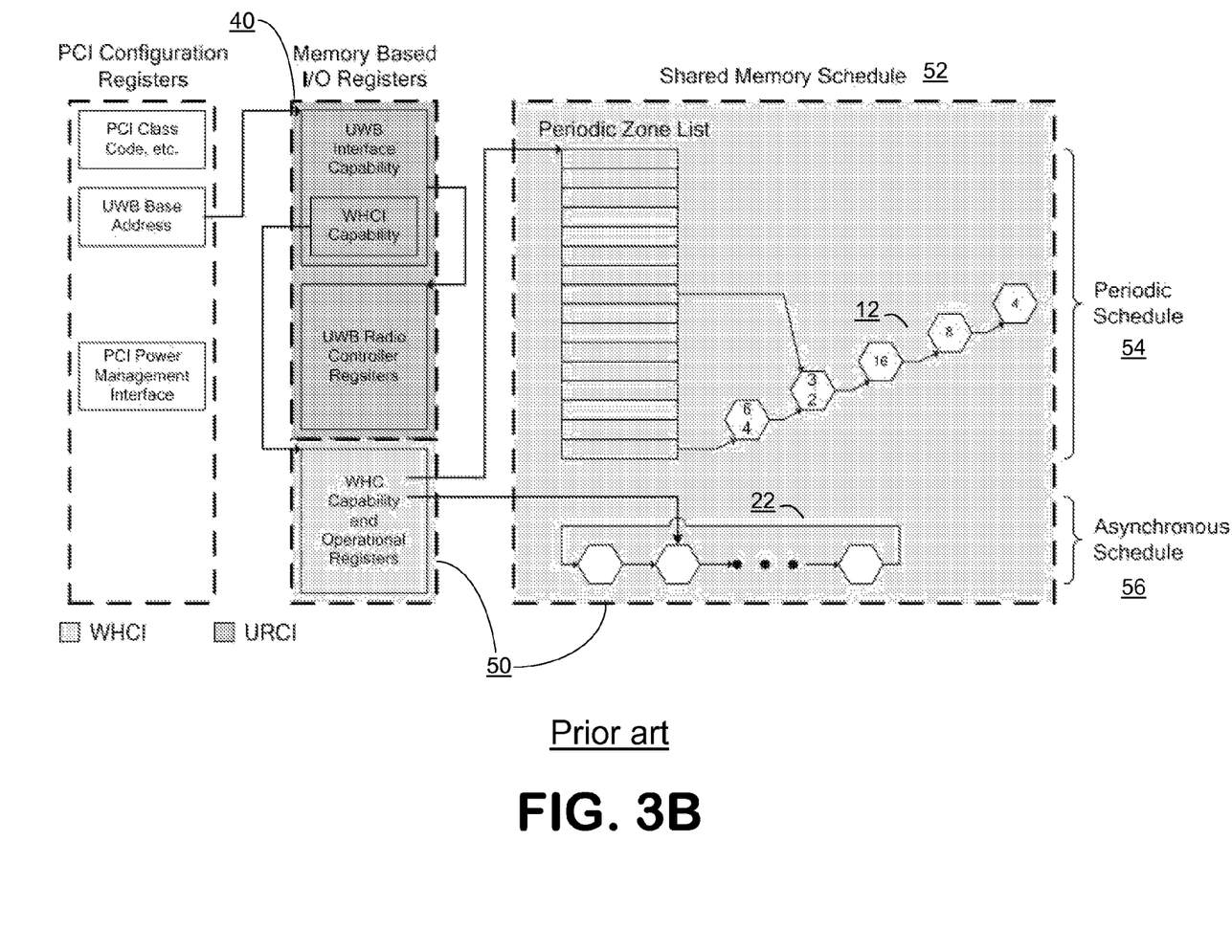
FIG. 3B illustrates prior art general architecture of an URCI and a WHCI.

FIG. 3B illustrates prior art general architecture of ultra wide band (UWB) radio controller (URCI) 40 and wireless USB host controller interface (WHCI) 50. Prior art WHCI 50 includes shared memory schedule 52 that handles both periodic schedule 54 and asynchronous schedule 56. It should be noted that shared memory schedule 52 may include both queues of periodic schedule 54 (e.g. one or more prior art periodic transmission queues 12) and queues of asynchronous schedule 56 (e.g. one or more prior art asynchronous transmission queues 22).

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

SUMMARY OF THE INVENTION

A universal serial bus (USB) communication system, the communication system including: (a) at least one asynchronous transmission queue manager configured to queue, in at least one asynchronous transmission queue, information for asynchronous transmission through at least one asynchronous pipe; (b) at least one guaranteed transmission queue manager configured to insert into at least one queue information for transmission through a dedicated pipe utilized by the communication system; wherein the at least one queue is selected from the at least one asynchronous transmission queue, at least one periodic transmission queue and at least one additional queue; and (c) a transmitter configured to transmit information through the at least one asynchronous pipe and the dedicated pipe, wherein the transmitting through the dedicated pipe is prioritized over the transmitting at the at least one asynchronous pipe, wherein the transmitting at the dedicated pipe is irrespective of time in which information for transmission at the dedicated pipe is inserted into the at least one queue.

A method for communicating, the method including: (a) queuing, in at least one asynchronous transmission queue, information for asynchronous transmission through at least one asynchronous pipe; (b) inserting into at least one queue information for transmission through a dedicated pipe; wherein the at least one queue is selected from the at least one asynchronous transmission queue, at least one periodic transmission queue and at least one additional queue; and (c) transmitting information through the at least one asynchronous pipe and through the dedicated pipe, wherein the transmitting through the dedicated pipe is prioritized over the transmitting through the at least one asynchronous pipe, wherein the transmitting through the dedicated pipe is irrespective of time in which the information for transmission through the dedicated pipe is inserted into the at least one queue.

DETAILED DESCRIPTION OF THE PRESENT INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

As aforementioned, in EHCI (Enhanced Host Controller Interface Specification) for wired USB (e.g. USB 2.0) and in WHCI (Wireless Host Controller Interface Specification) for wireless USB (e.g. WUSB 1.0), two schedules are defined for the respective controller to schedule air/wire time:

i. A periodic schedule including isochronous and interrupt endpoints, accessed per service interval; and ii. An asynchronous schedule including bulk and control endpoints, accessed in round-robin best effort manner.

The devices, systems, and methods herein disclosed implement a new transfer type, which may be used, for example, to accommodate applications that require guaranteed data delivery in addition to some quality of service. Throughout the rest of this document this transfer type is also referred to as "preferred bulk" or "periodic bulk". An endpoint that uses this transfer type may also be referred to as a "preferred bulk endpoint" or a "periodic bulk endpoint".

According to an embodiment of the invention, such preferred bulk endpoints conveniently have higher priority than the "regular" asynchronous schedule endpoints in order to assure some level of quality of service (QoS). According to different embodiments of the invention, the priority of such preferred bulk endpoints may be higher or lower (and possibly equal) to that of the periodic schedule.

Such flow type as disclosed may be implemented in various ways, some of which are disclosed below. Such techniques of adding preferred bulk data flow type, as herein discussed, may be used for USB and/or for wireless USB. Such addition may be implemented in corresponding USB/WUSB systems, methods, and computer program products. Some of the alternatives are:
  i. Add a 3rd schedule ($3^{rd}$ schedule)—Add an additional schedule including the preferred bulk endpoint. According to such embodiment of the invention, a device implementing the technique needs to manage at least three types of schedules, and to allocate time to each of the various types of schedules. According to an embodiment of the invention, three different queues may be implemented in the memory for the three different types, wherein information from regular periodic data flow queue are transmitted if possible according to their timing information, information from asynchronous data flow queue are transmitted in a sequential manner—regardless of transmission time, and information from the third schedule are transmitted in a periodic manner, wherein sufficient time allocation is allocated to this service in order to enable transmitted of a guaranteed amount of information.
  ii. Preferred bulk (PB) on the asynchronous schedule—In addition to the regular bulk and control endpoints, the new type of data flow ("preferred bulk") may be added to the asynchronous schedule. Information transmitted according to the new type of data flow may be given priority over regular bulk transmission, and thus may utilize the asynchronous time allocation even if bulk transmission information has already been queued before it (e.g. from another endpoint/application).
  iii. Preferred bulk (PB) on the periodic schedule—according to such an embodiment of the invention, the new data flow type is added to the periodic schedule, along with the regular isochronous (ISO) and interrupt endpoints. It is noted that bandwidth may be allocated to preferred bulk information, according to an embodiment of the invention, over other periodic schedule data (e.g. that of regular isochronous end-points) if necessary, in order to guarantee a guaranteed bandwidth to the preferred bulk transmission.

Table 1 includes a comparison between various embodiments of the above alternatives, when implemented for wireless USB.

TABLE 1

| Option | Complexity, effort | HW implications | Guaranteed BW | Multiple PB endpoints | Prioritization and air time management |
|---|---|---|---|---|---|
| PB in periodic schedule | Low (mostly WHCD, but also in WHC) | No | Yes | Yes | PB may be of equal priority with ISO. May leave 20% for async. May adjust |

TABLE 1-continued

| Option | Complexity, effort | HW implications | Guaranteed BW | Multiple PB endpoints | Prioritization and air time management |
|---|---|---|---|---|---|
| 3rd schedule | High (WHCD and WHC) Must change existing implementations in many places | New registers for duplicating async or periodic schedule | Yes | Yes | PB BW on the fly Flexible in priority vs. both schedules Harder to leave 20% for async |
| PB in async schedule | High (algorithm, system, WHCD, WHC) | No | Maybe - hard to implement | Complex | Hard to define and implement prioritization vs. async schedule |

Figure 4:
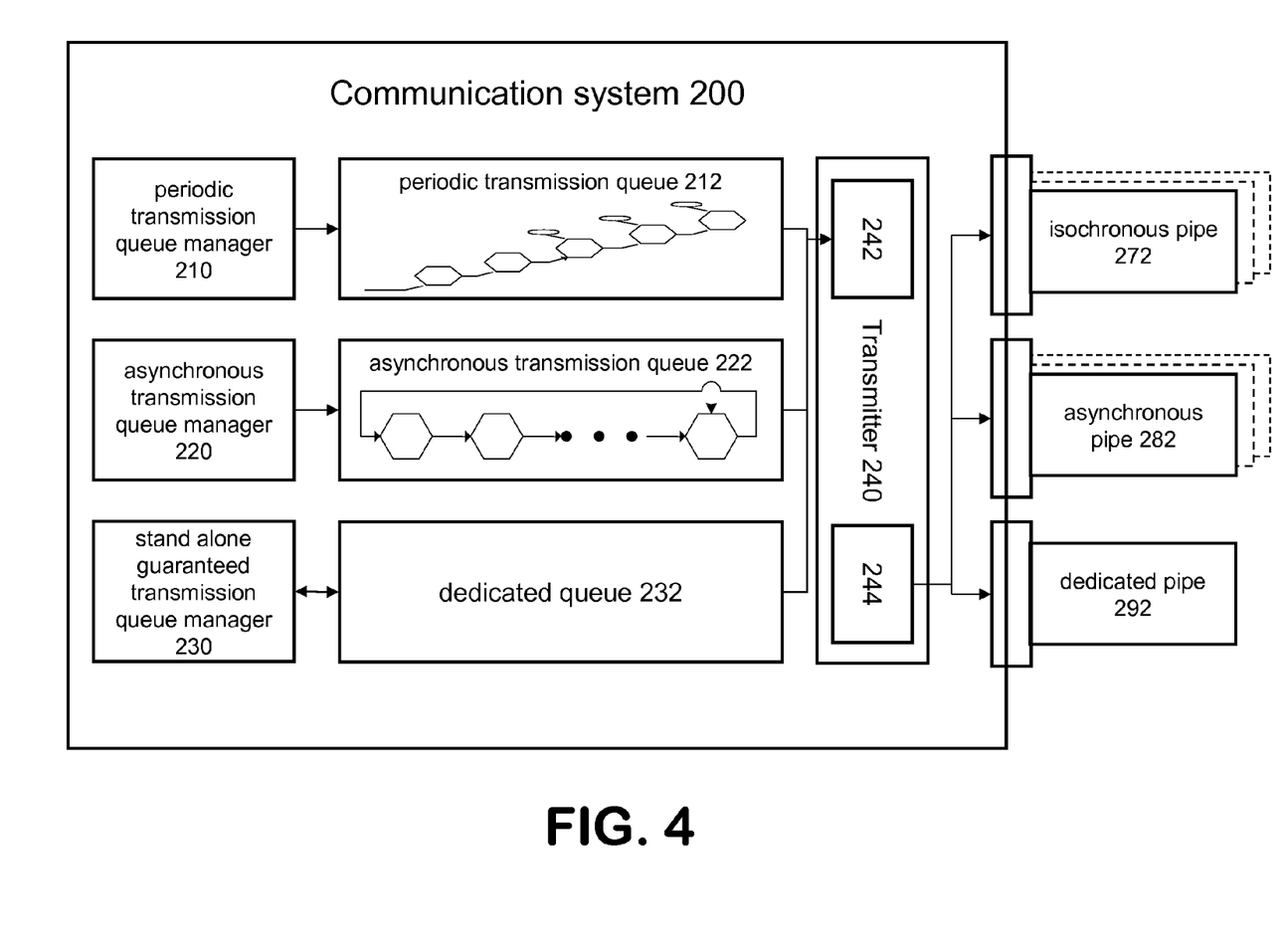
FIG. 4 illustrates a communication system, according to an embodiment of the invention.

FIG. 4 illustrates communication system 200, according to an embodiment of the invention. Communication system 200 may be a wireless USB system in that it participates in wireless USB communication. It is noted that, according to various embodiments of the invention, communication system 200 may also be implemented for wired USB, mutatis mutandis. It is noted that wherever wireless USB is mentioned, in other embodiments of the invention, wired USB may be implemented—either instead or in addition to wireless USB.

According to various embodiments of the invention, communication system 200 fully supports the wireless USB protocol (e.g. wireless universal serial bus specification, revision 1.0, and/or future revisions). Communication system 200 may conveniently communicate with all standard wireless USB systems, without implementing its non-standard features as disclosed herein. It is noted that the term USB system refers to systems that utilizes wired USB standard and/or wireless USB standard. It is noted that such systems may also implement other communication standards in addition to any of the aforementioned USB standards.

According to various embodiments of the invention, communication system 200 may be, for example, an UWB communication system with wireless USB capabilities, a wireless USB host, a wireless USB device, a wireless USB system including both a host and at least one device, etc.

Communication system 200 includes at least one transmission queue manager, for managing multiple transmission queues that store information to be wirelessly transmitted over multiple endpoints of communication system 200. It is noted that in some embodiments of the invention, a single transmission queue manager may be configured to manage transmission queue of different types (e.g. incorporating both the below identified asynchronous transmission queue manager and periodic transmission queue manager), however, this is not necessarily so. The one or more transmission queue managers of communication system 200 may be implemented by one or more processors of communication system 200.

It is noted that some of the transmission queue managers may be queue managers known with respect to prior art wireless USB systems, e.g. in such system as described in the wireless USB specifications revision 1.0, and in FIGS. 1A, 1B, 3A and 3B.

Communication system 200 includes at least one asynchronous transmission queue manager 220 configured to queue, in at least one asynchronous transmission queue 222, information for asynchronous transmission through at least one asynchronous pipe 282.

Conveniently, at least one asynchronous transmission queue 222 may be included in communication system 200. Conveniently, at least one asynchronous pipe 282 may be at least one asynchronous pipe utilized by communication system 200.

It is noted that the terms "pipe of a system", "pipes used by the system", and "pipes configured in the system" may be used interchangeably.

Conveniently, all the information to be transmitted through all of the asynchronous pipes 282 used by communication system 200 is queued in asynchronous transmission queues 222 managed by the least one asynchronous transmission queue manager 220.

One or more asynchronous pipes 282 may be bulk transmission pipes, and one or more asynchronous pipes 282 may be control transmission pipes. It is noted that, according to an embodiment of the invention, at least one asynchronous transmission queue 222 may also queue information indicative of information expected to be received through at least one asynchronous pipe 282 utilized by communication system 200 (e.g. if said pipe is an IN pipe).

According to an embodiment of the invention, communication system 200 further includes at least one periodic transmission queue manager 210 configured to queue, in at least one periodic transmission queue 212, information for isochronous transmission through at least one isochronous pipe 272 (according to an embodiment of the invention, at least one isochronous or interrupt pipe 272. It is noted that one or more of the at least one periodic transmission queue manager 210 may be configured to queue, in at least one periodic transmission queue 212 of communication system 200, information for periodic transmission through at least one interrupt pipe utilized by communication system 200.

Conveniently, at least one periodic transmission queue 212 may be included in communication system 200. Conveniently, at least one isochronous pipe 272 (or, according to an embodiment of the invention, interrupt pipe) is at least one isochronous pipe (or, respectively, interrupt pipe) that is utilized by communication system 200.

Conveniently, all the information to be transmitted through all of the periodic pipes of communication system 200 is queued in the at least one periodic transmission queue 212 managed by the least one asynchronous transmission queue manager 210. It is noted that, according to an embodiment of the invention, at least one periodic transmission queue 212 may also queue information indicative of information expected to be received through at least one periodic pipe utilized by communication system 200 (e.g. if said pipe is an IN pipe).

Communication system 200 includes at least one guaranteed transmission queue manager configured to insert into at least one queue information for transmission through dedicated pipe 292 that is utilized by communication system 200, wherein the at least one queue is selected from the at least one asynchronous transmission queue, at least one periodic transmission queue and at least one additional queue. Dedicated pipe 292 may conveniently be used for transmissions utilizing the aforementioned new data flow type, which may be used, for example, to accommodate applications that require guaranteed data delivery in addition to some quality of service. It is noted that communication system 200 may include more than one dedicated pipe 292 (e.g. for more than one application, for both IN and OUT going communication, etc.).

According to an embodiment of the invention, the guaranteed transmission queue manager is implemented by one or more of the at least one asynchronous transmission queue manager 220 (i.e. that one or more queue manager is capable of both queuing information in one or more asynchronous transmission queues 222, and inserting into those one or more asynchronous transmission queues information for transmission through dedicated pipe 292). Such an implementation, by way of example, may be implemented in the new data flow type is implemented in the asynchronous schedule. It is however noted that implementation in the asynchronous schedule does not necessitate using for the dedicated pipe the same queues used for the bulk/control pipes.

According to an embodiment of the invention, the guaranteed transmission queue manager is implemented by one or more of the at least one periodic transmission queue manager 210 (i.e. that one or more queue manager is capable of both queuing information in one or more periodic transmission queues 212, and inserting into those one or more periodic transmission queues information for transmission through dedicated pipe 292). Such an implementation, by way of example, may be implemented in the new data flow type is implemented in the periodic schedule. It is however noted that implementation in the periodic schedule does not necessitate using for the dedicated pipe the same queues used for the isochronous/interrupt pipes.

According to an embodiment of the invention, communication system 200 includes at least one guaranteed transmission queue manager 230 that is not used for queue information for any of the isochronous/bulk/interrupt/control pipes. That stand alone guaranteed transmission queue manager 230 may be configured to insert the information for transmission through dedicated pipe 292 into at least one dedicated queue 232, dedicated to dedicated pipe 292. It is noted that according to different embodiments of the invention that implement dedicated queue 232, dedicated queue 232 may implement different types of schedules (e.g. periodic, asynchronous).

According to an embodiment of the invention, that stand alone guaranteed transmission queue manager 230 may be configured to insert the information for transmission through dedicated pipe 292 into one or more asynchronous queues utilized for bulk/control transmissions, and/or into one or more periodic queues utilized for interrupt/isochronous transmissions.

Dedicated pipe 292 may conveniently be used for transmissions utilizing the aforementioned new data flow type, which may be used, for example, to accommodate applications that require guaranteed data delivery in addition to some quality of service. It is noted that communication system 200 may include more than one dedicated pipe 292 (e.g. for more than one application, for both IN and OUT going communication, etc.).

Communication system 200 further includes transmitter 240 that is configured to transmit information through the at least one asynchronous pipe 282, the dedicated pipe 292, and—according to an embodiment of the invention, through the at least one isochronous pipe 272—wherein the transmitting through dedicated pipe 292 is prioritized over the transmitting through the at least one asynchronous pipe 282.

According to an embodiment of the invention, the transmitting through dedicated pipe 292 is irrespective of time in which information for transmission through dedicated pipe 292 is inserted into at least one of the queues. That is, contrary to isochronous pipes, in which some packets may be dropped if those packets become too old (e.g. due to connection failure), this is not implemented in those embodiments. It is noted that discarding of information that is too old may be implemented in some embodiments of the invention.

In order to avoid a situation in which queued information becomes too old to be relevant, different techniques may be implemented by communication system 200, some of which are disclosed below. For example, notifying an application that utilizes dedicated pipe 292 of a maximum count of packets that may be transmitted in each service interval (or other time period) may result in receiving from that application information in a rate that can be guaranteed for transmission (unless some drastic situation occurs, like severe interruption for wireless traffic).

It is noted that according to an embodiment of the invention, the transmitting through dedicated pipe 292 may be prioritized over the transmitting through only some (though at least one) of the multiple asynchronous pipes 282 implemented.

According to an embodiment of the invention, transmitter 240 may include (or be connected to) one or more transmission manager 242 that retrieve information from the different queues (e.g. 212, 222, 232) in response to a channel time allocation scheme, wherein the actual transmission is carried out by a physical communication component 244 of transmitter 240.

Conveniently, communication system 200 may further include a receiver (not illustrated) for receiving information through at least one IN going isochronous pipe 272, through at least one IN going asynchronous pipe 282, and possibly through at least one IN going dedicated pipe 292, if implemented. It is noted that in some embodiments only an IN going dedicated pipe 292 is implemented, wherein limitations quoted in relation to transmitter 240 and to transmitting by communication system 200 generally may be implemented, mutatis mutandis, for the receiver of communication system 200 and for reception by communication system 200 generally. It is noted that, according to an embodiment of the invention, such a receiver and transmitter 240 may be implemented as a transceiver.

It is noted that if communication system 200 is a wireless USB host, than transmitter 240 (and/or the receiver) may access—according to an embodiment of the invention—the respective pipes using multiple software memory buffers on the host. If communication system 200 is a wireless USB device (i.e. a device other than host, which connects to a wireless USB host), than transmitter 240 (and/or the receiver) may access—according to an embodiment of the invention— the respective pipes using multiple endpoints of the device.

According to an embodiment of the invention, transmitter 240 is configured to transmit through dedicated pipe 292 a predetermined amount of packets, irrespective of the information queued for transmission through the rest of the pipes used by communication system 200 (e.g. pipes 272, 282). That is, an allocating component of communication system 200 (e.g. transmission manager 242) may allocate for transmission in dedicated 292 sufficient channel time for transmission of the predetermined amount of packets, regardless of the amount of information queued in the queues. It is noted that some situations may occur in which requirements of the dedicated pipe may contradict the requirements of the pipes in the periodic schedule, and according to an embodiment of the invention, communication system 200 is configured not to break the existing mechanisms.

It is however noted that, according to an embodiment of the invention, if there is shortage of bandwidth and that allocating component identifies difficulties in ensuring the transmission of the predetermined amount of packets through dedicated pipe 292, it may decide to reduce that amount, and notify whichever entity that should be notified. It is noted that, conveniently, such modification of the maximum amount of packets to be transmitted in a service interval (of other such predetermined amount) may only take effect for future service interval (e.g. either the next service interval, in one of the next service intervals, after a predetermined amount and service intervals), so as to allow an entity that utilizes dedicated pipe 292 to transmit a smaller amount of packets per service interval—though an amount still guaranteed.

According to an embodiment of the invention, if a minimal amount of packets could not be guaranteed for transmission through dedicated pipe 292 (e.g. lower then a predetermined threshold or lower than a threshold determined by a device/application that utilizes the dedicated pipe 292), the allocating component may deny service from the device/application that utilizes dedicated pipe 292.

It is noted that if there was a failure to transmit the predetermined amount of information guaranteed at a first service interval, the allocating component (e.g. transmitting manager 242) may allocate more channel time for transmission through dedicated pipe 292, in order to compensate for the lost time, and to prevent discarding of untransmitted information.

According to an embodiment of the invention, communication system 200 further includes a transmission manager 242 (or other component of communication system 200) that is configured to determine a maximum count of packets that can be guaranteed for transmission through dedicated pipe 292 in a service interval. Transmission manager 242 is then further configured to inform an information source (e.g. an application, another entity, another connected device such as a router) about the maximum count, wherein the at least one guaranteed transmission queue manager (dedicated or not) receives, from the information source, information to be transmitted through dedicated pipe 292, wherein a size of the information does not exceed the maximum count of packets per service interval. For example, the maximum count may be three packets per service interval.

It is noted that time constrains other than service interval may be used (e.g. per 0.1 second), and that other measures of amount of information may be used (e.g. number of bytes).

It is noted that, according to an embodiment of the invention, transmission manager 242 (or the aforementioned other component) may be configured to determine the maximum count of packets in response to various parameters, such as one or more of the following: requirements of the entity utilizing dedicated pipe 292, available channel bandwidth, dynamic behavior of the channel (e.g. changing isochronous/interrupt pipes, varying channel bit rate, etc.), and so forth.

According to an embodiment of the invention, the at least one guaranteed transmission queue manager (whether stand alone or not) is further configured to insert at least a part of the information for transmission through dedicated pipe 292 into at least one of the periodic transmission queues 212.

According to different embodiments of the invention, the priority of the information for transmission through the dedicated pipe may be prioritized in different ways in respect to other periodic transmission.

According to an embodiment of the invention, the at least one guaranteed transmission queue manager is further configured to assign to a transmission of the at least part of the information a priority that is higher than a priority assigned to a transmission of previously queued information that was queued in that at least one periodic transmission queue for isochronous transmission.

According to an embodiment of the invention, one or more of the queue managers of system 200 may assign to a transmission of the at least part of the information a priority that is higher than a priority assigned to a transmission of previously queued information that was queued in the at least one periodic transmission queue for isochronous transmission. This may be used, by way of example, for enabling transmission of a predetermined number of packets through the dedicated pipe in the next service interval.

According to an embodiment of the invention, at least a minimal portion of the information for other periodic transmissions may be prioritized over the information for transmission in the dedicated pipe. This may be required, for example, for backward compatibility with existing USB systems.

If there is not enough bandwidth available, different actions may be implemented. As discussed elsewhere in this disclosure, in some embodiments in such a situation, system 200 may inform an application that utilizes the dedicated pipe that the maximum count of information that may be transmitted in the dedicated pipe was reduced. It is noted that, according to an embodiment of the invention, system 200 may deny service over a dedicated pipe 292 (from at least one application/device), if it is determined that a minimal QoS service can not be met.

It is noted that dedicated pipe 292 is used by communication system 200 to transmit information in a data flow that is different than the standard data flows accounted for in the USB standard (e.g. USB standard revision 2.0) and the wireless USB standard (e.g. wireless USB standard revision 1.0). There are different ways in which the wireless USB host and the wireless device may implement this new data flow type.

According to an embodiment of the invention, one or more of the queue managers of system 200 may assign to a transmission of the at least part of the information a priority that is higher than a priority assigned to a transmission of previously queued information that was queued in the at least one asynchronous transmission queue for asynchronous transmission.

According to an embodiment of the invention, at least a minimal portion of the information for other asynchronous transmissions may be prioritized over the information for transmission in the dedicated pipe.

According to an embodiment of the invention, communication system 200 further comprises a device descriptor analyzer (not illustrated, may be implemented—by way of example—in an aforementioned processor of communication system 200, in a transmission and/or reception manager, and so forth) configured to analyze device descriptors of received communication (e.g. from an application or entity utilizing dedicated pipe 292), and to identify—prior to the inserting of the information to be transmitted through dedicated pipe 292 into its suiting queue—information for transmission through the dedicated pipe in response to a device descriptor that is different than device descriptors of isochronous pipes, of interrupt pipes, of control pipes and of bulk pipes. It is noted that other types of descriptors may also be used (e.g. in communication between a software run by a computer in which communication system 200 is installed and communication system 200).

According to an embodiment of the invention, such a device descriptor analyzer may identify device descriptors of communication received through the different pipes 272, 282, and 292 of communication system 200.

According to an embodiment of the invention, the device descriptor analyzer may further learn from received device descriptors of other information required for the communication through dedicated pipe 292 (such as expected data rate, standard deviation of this rate, encoding methods, packet size, etc.).

According to an embodiment of the invention, a component of communication system 200 (e.g. transmitter 240) is configured to include device descriptors in communication transmitted to a receiving USB entity through the different pipes 272, 282, and/or 292.

According to an embodiment of the invention, transmitter 240 is further configured to transmit through dedicated pipe 292 in the periodic schedule every service interval, and to attempt to transmit all the information queued for transmission through dedicated pipe 292 (e.g. in stand alone guaranteed transmission queue manager 230, if implemented) without time-outs related to freshness of data (unlike periodic transmissions, in which packets may age and be timed-out because of their lack of freshness—because they are not longer relevant for transmission).

According to an embodiment of the invention, transmitter 240 is further configured to transmit through dedicated pipe 292 in the periodic schedule every service interval, and to attempt to transmit all the information queued for transmission through dedicated pipe 292 (e.g. in stand alone guaranteed transmission queue manager 230, if implemented) without dropping packets if a delivery failure did not occur.

It is noted that in some embodiments of the invention, in which service interval for transmission by dedicated pipe can not be guarantied in all situations, only priority is guaranteed of the dedicated pipe 292.

According to an embodiment of the invention, communication system 200 further includes transmission manager 242 that is configured to allocate, prior to the transmitting, channel time to the at least one asynchronous pipe, to the dedicated pipe (and, according to an embodiment of the invention, to the at least one isochronous pipes and/or the at least one interrupt pipes), wherein for that allocating, transmission manager 242 is configured to allocate first channel time for asynchronous transmission through the at least one asynchronous pipes; and allocate third channel time for guaranteed periodic transmission through the dedicated pipe (and, according to an embodiment of the invention, allocate second channel time for isochronous transmission through the at least one isochronous pipe); wherein transmission manager 242 is further configured to allocate, when allocating the third channel time, sufficient channel time for transmission of a predetermined amount of information.

It is noted that transmission manager 242 may allocate a null second channel time (or not allocate second channel time at all), e.g. in situations in which no connected device requires isochronous transmission through the at least one isochronous pipe.

According to an embodiment of the invention, transmitter 240 is further configured to transmit information through the pipes of communication system 200 according to a result of the allocating.

According to an embodiment of the invention, transmission manager 242 is further configured to prioritizing, when allocating channel time, periodic transmission over transmission through dedicated pipe 292; to reduce the maximum count of packets that can be guaranteed for transmission through dedicated pipe 292 if there is no sufficient channel time for minimal guaranteed isochronous transmission; and to inform an application that utilizes dedicated pipe 292 that the maximum count was reduced.

According to an embodiment of the invention, the at least one guaranteed transmission queue manager (whether stand alone or not) is further configured to insert at least a part of the information for transmission through dedicated pipe 292 into at least one of the asynchronous transmission queues 222, wherein a transmission of the at least part of the information is assigned a priority that is higher than a priority assigned to a transmission of previously queued information that was queued in the that at least one asynchronous transmission queue for bulk transmission.

According to an embodiment of the invention, the utilization of dedicated 292 as disclosed in relation to various embodiments of the invention, may be preceded by installation of (or modification of an existing) host controller and/or of a host controller interface and/or of a host controller driver and/or of a USB bus driver (e.g. WHC, WHCI, WHCD in wireless communication).

According to various embodiment of the invention, one or more of: (a) host controller; (b) host controller interface; (c) a host controller driver; and (d) USB bus driver are implemented to support the various embodiments of the invention discussed, without explicitly elaborating the specification of such components.

According to an embodiment of the invention, all transmission according to the dedicated data flow type suggested need to be acknowledged by a receiver of that transmission (e.g. by transmitting ACK messages—whether dedicated to the data flow type or not).

It is noted that any non-contradicting combination of one or more of the different characteristics and/or functionalities discussed in relation to the various aforementioned embodiments of the invention may be combines in a single embodiment of the invention, even if not explicitly elaborated.

According to an embodiment of the invention, the periodic schedule implemented for the disclosed new data flow type, if applicable, may be based on a Periodic Zone List which is the root of all standard periodic (isochronous and interrupt transfer type) support for the WHC interface. Like isochronous data streams, the data streams of the new data flow type streams may be managed—according to an embodiment of the invention—using Queue Heads (QHeads) with Isochronous Queue Element Transfer Descriptors.

According to an embodiment of the invention, the asynchronous schedule implemented for the disclosed new data flow type, if applicable, may be based on an asynchronous transfer list that is the root for all the bulk and control transfer type support. Like Control and Bulk data streams, the data streams of the new data flow type streams may be managed—according to an embodiment of the invention—via QHeads and Queue Element Transfer Descriptors. These data structures are optimized to reduce the total memory footprint of the schedule and to reduce (on average) the number of memory accesses needed to execute Wireless USB transactions.

Figure 5:
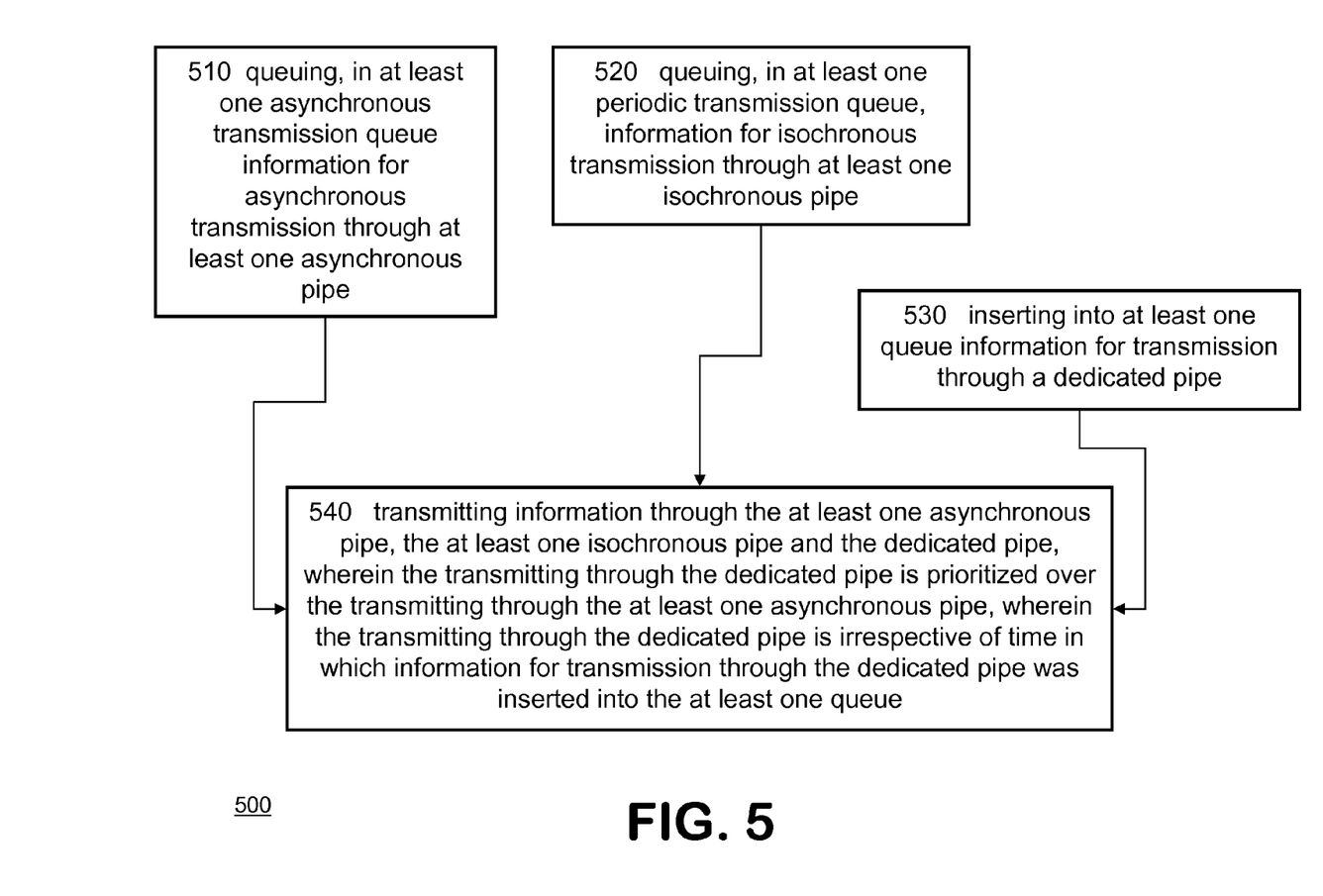
FIG. 5 illustrates a method for communicating, according to an embodiment of the invention.

FIG. 5 illustrates method 500 for communicating, according to an embodiment of the invention. It is noted that various embodiments of method 500 may be carried out by the various aforementioned embodiments of communication system 200, and that all the various aforementioned embodiments of communication system 200 may be implemented by various embodiments of method 500, mutatis mutandis.

Method 500 includes stage 510 of queuing, in at least one asynchronous transmission queue information for asynchronous transmission through at least one asynchronous pipe.

Referring to the examples set forth in the previous drawings, stage 510 may be carried out by asynchronous transmission queue manager 220. Conveniently, the at least one asynchronous pipe is at least one asynchronous pipe utilized by a universal serial bus (USB) communication system (which may be a wired USB communication system and/or a wireless USB communication system. e.g. communication system 200).

According to an embodiment of the invention, method 500 further includes stage 520 of queuing, in at least one periodic transmission queue, information for isochronous (or, according to an embodiment of the invention, interrupt) transmission through at least one isochronous (or, respectively, interrupt) pipe. Referring to the examples set forth in the previous drawings, stage 520 may be carried out by periodic transmission queue manager 210. Conveniently, the at least one isochronous (or, respectively, interrupt) pipe may be at least one isochronous (or, respectively, interrupt) pipe utilized by the communication system of stage 510. It is noted that in some situations, even if a system that carries out method 500 (e.g. system 200) is capable of queuing in the at least one periodic transmission queue information for isochronous transmission—a device that requires isochronous transmission may not be connected to that system. Therefore, in some situations stage 520 is selectively carried out in response to a requirement by a connected device.

Method 500 further includes stage 530 of inserting into at least one queue information for transmission through a dedicated pipe, wherein the at least one queue is selected from the at least one asynchronous transmission queue, at least one periodic transmission queue and at least one additional queue. Referring to the examples set forth in the previous drawings, stage 530 may be carried out by different components of communication system 200 in different embodiments of the invention, e.g. asynchronous transmission queue manager 220, periodic transmission queue manager 210, and/or stand alone guaranteed transmission queue manager 230. Conveniently, the dedicated pipe may be a dedicated pipe utilized by the communication system of stages 510 and 520.

Method 500 further includes stage 540 of transmitting information through the at least one asynchronous pipe and the dedicated pipe (and, according to an embodiment of the invention, through the at least one isochronous or interrupt pipe), wherein the transmitting through the dedicated pipe is prioritized over the transmitting through the at least one asynchronous pipe, wherein the transmitting through the dedicated pipe is irrespective of time in which information for transmission through the dedicated pipe is inserted into the at least one queue. Referring to the examples set forth in the previous drawings, the transmitting may be carried out by transmitter 240.

It is noted that any combination of two or more of stage 510, 520, 530, and 540 may be (though not necessarily, and not in some embodiments) carried out at least partly concurrently.

It is noted that some or all of the various stages of method 500 may be reiterated—e.g. every predetermined duration (such as every service interval, every 256 microseconds, each of the Allocation Zones (4.096 msec) of the superframe, etc.). The transmitting may include transmitting of information queued in previous iterations. The reiteration may be implemented for the other stages of method 500 discussed below, wherever applicable.

According to an embodiment of the invention, the transmitting through the dedicated pipe includes transmitting a predetermined amount of packets; irrespective of the information queued for transmission through the rest of the pipes.

According to an embodiment of the invention, the inserting is preceded by: determining a maximum count of packets that can be guaranteed for transmission through the dedicated pipe in a service interval, informing an information source about the maximum count, and receiving, from the information source, information to be transmitted through the dedicated pipe, wherein a size of the information does not exceed the maximum count of packets per service interval.

According to an embodiment of the invention, the inserting includes inserting at least a part of the information for transmission through the dedicated pipe into at least one of the periodic transmission queues.

According to different embodiments of the invention, the priority of the information for transmission through the dedicated pipe may be prioritized in different ways in respect to other periodic transmission.

According to an embodiment of the invention, the method further includes assigning to a transmission of the at least part of the information a priority that is higher than a priority assigned to a transmission of previously queued information that was queued in the that at least one periodic transmission queue for isochronous transmission. This may be used, by way of example, for enabling transmission of a predetermined number of packets through the dedicated pipe in the next service interval.

According to an embodiment of the invention, at least a minimal portion of the information for other periodic transmissions may be prioritized over the information for transmission in the dedicated pipe. This may be required, for example, for backward compatibility with existing USB systems. If there is not enough bandwidth available, different actions may be implemented. As discussed elsewhere in this disclosure, in some embodiments in such a situation, the method may include informing an application that utilizes the dedicated pipe that the maximum count of information that may be transmitted in the dedicated pipe was reduced. It is noted that, according to an embodiment of the invention, the method may include denying service over the dedicated pipe (from at least one application/device), if it is determined that a minimal QoS service can not be met.

According to an embodiment of the invention, the inserting is preceded by identifying information for transmission through the dedicated pipe in response to a device descriptor that is different than device descriptors of isochronous pipes, of interrupt pipes, of control pipes and of bulk pipes.

According to an embodiment of the invention, the transmitting through the dedicated pipe includes transmitting through the dedicated pipe in the periodic schedule every service interval, wherein the transmitting includes attempting to transmit all the information queued for transmission through the dedicated pipe without dropping packets if a delivery failure did not occur.

According to an embodiment of the invention, the transmitting through the dedicated pipe includes transmitting through the dedicated pipe in the periodic schedule every service interval, wherein the transmitting includes attempting to transmit all the information queued for transmission through the dedicated pipe without time-outs related to freshness of data According to an embodiment of the invention, method 500 further includes allocating, prior to the transmitting, channel time to the at least one asynchronous pipe and to the dedicated pipe (and, according to an embodiment of the invention, to the at least one isochronous pipe and/or the at least one interrupt pipe), wherein the allocating includes: allocating first channel time for asynchronous transmission through the at least one asynchronous pipes and allocating third channel time for guaranteed periodic transmission through the dedicated pipe (and. According to an embodiment of the invention, also allocating second channel time for isochronous transmission through the at least one isochronous pipe and/or the at least one interrupt pipe); wherein the allocating of the third channel time includes allocating sufficient channel time for transmission of a predetermined amount of information. According to an embodiment of the invention, the transmitting may include transmitting information through the pipes of the communication system according to a result of the allocating.

According to an embodiment of the invention, the allocating includes prioritizing isochronous transmission over transmission through the dedicated pipe; reducing the maximum count of packets that can be guaranteed for transmission through the dedicated pipe if there is no sufficient channel time for minimal guaranteed isochronous transmission; and informing an application that utilizes the dedicated pipe that the maximum count was reduced.

According to an embodiment of the invention, the inserting includes inserting at least a part of the information for transmission through the dedicated pipe into at least one of the asynchronous transmission queues, wherein the method further comprises assigning to a transmission of the at least part of the information a priority that is higher than a priority assigned to a transmission of previously queued information that was queued in the that at least one asynchronous transmission queue for asynchronous transmission.

Referring to both system 200 and method 500, it is note that, according to an embodiment of the invention, the transmission in the dedicated pipe may be prioritized over asynchronous transmission in the one or more asynchronous pipes, and prioritized under periodic transmission (or at least under a minimal guaranteed level in the periodic transmission).

According to an embodiment of the invention, the transmission in the dedicated pipe is prioritized in the highest priority, unless it contradicts minimal guaranteed levels in the periodic schedule (and possibly also in the asynchronous schedule).

Figure 6:
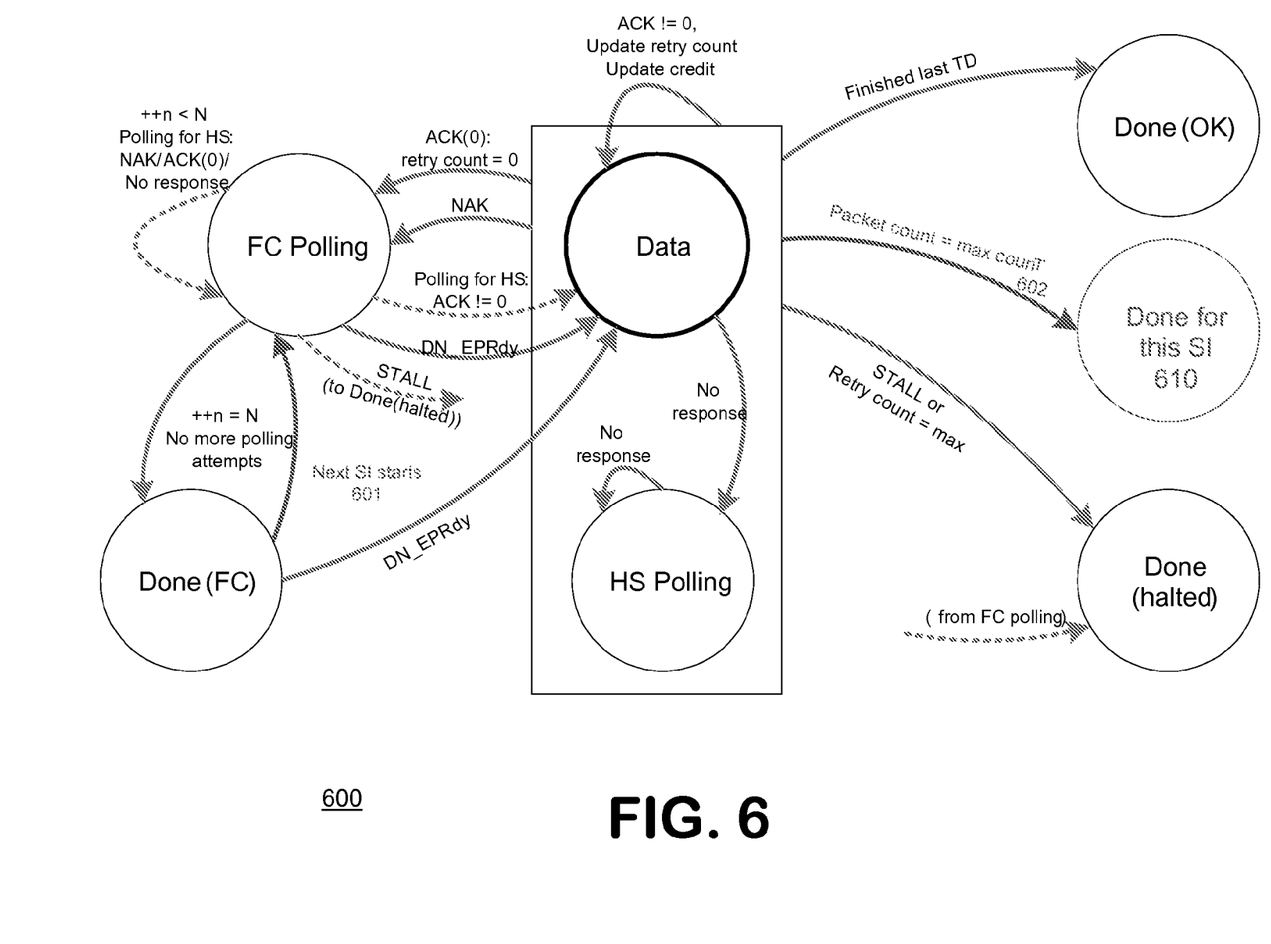
FIG. 6 is illustrates a state machine for OUT going transmissions, according to an embodiment of the invention.
Figure 7:
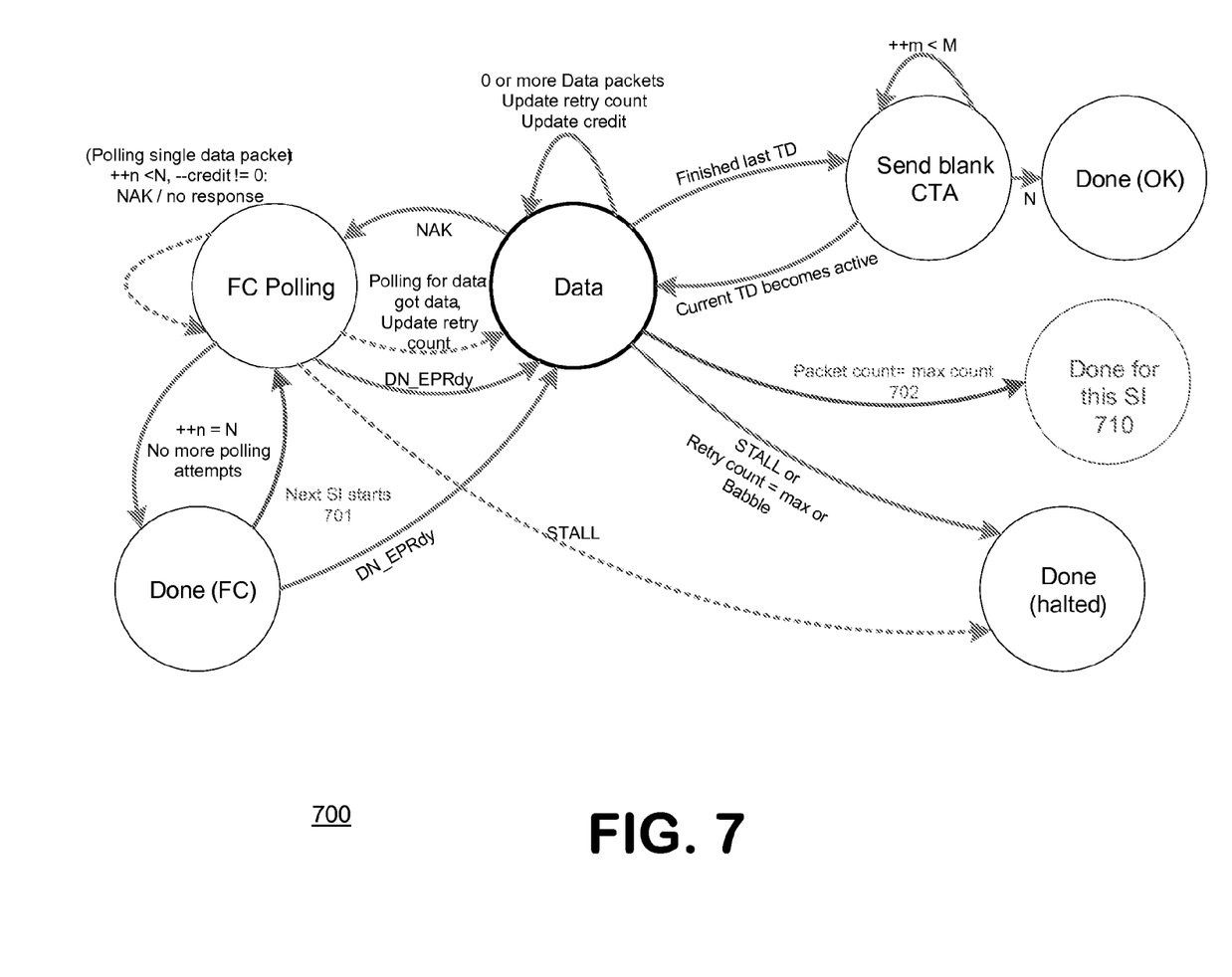
FIG. 7 illustrates a state machine for IN going transmissions, according to an embodiment of the invention.

FIGS. 6 and 7 illustrate implementation details of the disclosed new data flow type as implemented on the periodic schedule, according to an embodiment of the invention. FIG. 6 is illustrates state machine 600 for OUT going transmissions, according to an embodiment of the invention, and FIG. 7 illustrates state machine 700 for IN going transmissions, according to an embodiment of the invention.

According to an embodiment of the invention, identification of bulk endpoints which need preferred service can use device descriptors. The parameters of these bulk endpoints are pre-defined and pre-tuned for optimal performance of the known endpoint.

According to an embodiment of the invention, preferred bulk operation includes placing a bulk queue on the periodic schedule. For WUSB/WHCI, the driver may set maxCount parameters which control channel access during the service interval (as in isochronous). maxCount can be adjusted in run-time by the driver to react to channel BW dynamic behavior (e.g. changing isochronous/interrupt endpoints, varying channel bit rate, etc.). For USB/EHCI, the driver may use Maximum Packet Length, High-Bandwidth Pipe Multiplier (Mult), and other related fields of the QHead to control quality of service of the bulk endpoint in a similar manner.

Referring to FIGS. 6 and 7, those figures illustrate two state diagrams, which show a possible implementation of the new data flow type (also referred to as preferred bulk) endpoint/pipe in wireless USB, according to an embodiment of the invention.

Only the transitions illustrated by arrows 601 and 602 in FIGS. 6, and 701 and 702 in FIG. 7, and the states illustrated by state 610 in FIG. 6 and state 710 in FIG. 7—are new to the new data form, and all the rest of the illustrated states and transmissions are implemented in standard bulk endpoints. According to an embodiment of the invention, the number of flow control (FC) polling retries ("N") can be selected differently if entering the state from the DATA state, or upon start of a service interval after a previous flow control.

In both of FIGS. 6 and 7, the following notation is used:
i. SI stands for service interval;
ii. FC stands for flow control;
iii. TD stands for transfer descriptor;
iv. HS stands for handshake;
v. DN stands for device notification;
vi. EPRdy stands for endpoint ready; and
vii. CTA stands for channel time allocation.

In OUT going transmission, transition 602 indicates that if when transmitting through the dedicated pipe, the number of packets transmitted is equal to the maximum number of guaranteed transmission, the transmission ceases for this service interval, and resumes in the next interval (transition 601). It is noted that if there is sufficient bandwidth, the ceasing of the transmission may not be necessary, in some embodiments of the invention.

In IN going transmission, transition 702 indicates that if when receiving in through dedicated pipe, the number of packets received is equal to the maximum number of guaranteed transmission, the transmission (and thus the reception) ceases for this service interval, and resumes in the next interval (transition 701). It is noted that if there is sufficient bandwidth, the ceasing of the transmission may not be necessary, in some embodiments of the invention.

The state machines illustrated in FIGS. 6 and 7 may be implemented by USB devices (wired and/or wireless), as methods for transmitting and/or receiving USB communication, and as computer program products that includes executable instructions for transmitting and/or receiving USB communication.

Such systems, methods, and computer program product conveniently are implemented in USB solutions which also enable the periodic schedule and the asynchronous schedule.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. A method for communicating, the method comprising:
   queuing, in at least one asynchronous transmission queue, information for asynchronous transmission through at least one asynchronous pipe;
   inserting into at least one queue information for transmission through a dedicated pipe that differs from the at least one asynchronous pipe and from at least one isochronous pipe; wherein the at least one queue is selected from the at least one asynchronous transmission queue, at least one periodic transmission queue and at least one additional queue; and
   transmitting information through the at least one asynchronous pipe and through the dedicated pipe, wherein the transmitting through the dedicated pipe is prioritized over the transmitting through the at least one asynchronous pipe, wherein the transmitting through the dedicated pipe is irrespective of time in which the information for transmission through the dedicated pipe is inserted into the at least one queue.

2. The method according to claim 1, further comprising queuing, in at least one periodic transmission queue, information for isochronous transmission through at least one isochronous pipe; wherein the transmitting further comprises transmitting through the at least one isochronous pipe.

3. The method according to claim 1, wherein the transmitting through the dedicated pipe comprises transmitting a predetermined amount of packets irrespective of the information queued for transmission through the rest of the pipes.

4. The method according to claim 1, wherein the inserting is preceded by:
   determining a maximum count of packets that can be guaranteed for transmission in the dedicated pipe in a service interval;
   informing an information source about the maximum count; and
   receiving information, from the information source, to be transmitted through the dedicated pipe, wherein a size of the information does not exceed the maximum count of packets per service interval.

5. The method according to claim 1, wherein the inserting comprises inserting at least a part of the information for transmission through the dedicated pipe into at least one of the periodic transmission queues.

6. The method according to claim 1, wherein the inserting is preceded by identifying information for transmission through the dedicated pipe in response to a device descriptor that is different than device descriptors of isochronous pipes, of interrupt pipes, of control pipes and of bulk pipes.

7. The method according to claim 1, wherein the transmitting through the dedicated pipe comprises transmitting through the dedicated pipe in the periodic schedule every service interval, wherein the transmitting comprises attempting to transmit all the information queued for transmission through the dedicated pipe without time-outs related to freshness of data.

8. The method according to claim 1, further comprising:
   allocating, prior to the transmitting, channel time to the at least one asynchronous pipe, to the at least one isochronous pipes, and to the dedicated pipe, wherein the allocating comprises: (a) allocating first channel time for asynchronous transmission through the at least one asynchronous pipes; (b) allocating second channel time for isochronous transmission through the at least one isochronous pipe; and (c) allocating third channel time for guaranteed periodic transmission through the dedicated pipe; wherein the allocating of the third channel time comprises allocating sufficient channel time for transmission of a predetermined amount of information;
   wherein the transmitting comprises transmitting information through the pipes of the communication system according to a result of the allocating.

9. The method according to claim 8, wherein the allocating comprises:
   prioritizing isochronous transmission over transmission through the dedicated pipe;
   reducing a maximum count of packets that can be guaranteed for transmission through the dedicated pipe if there is no sufficient channel time for minimal guaranteed isochronous transmission; and
   informing an application that utilizes the dedicated pipe that the maximum count was reduced.

10. The method according to claim 1, wherein the inserting comprises inserting at least a part of the information for transmission through the dedicated pipe into at least one of the asynchronous transmission queues, and assigning to a transmission of the at least part of the information a priority that is higher than a priority assigned to a transmission of previously queued information that was queued in the that at least one asynchronous transmission queue for asynchronous transmission.

11. A universal serial bus (USB) communication system, the communication system comprising:
- at least one asynchronous transmission queue manager configured to queue, in at least one asynchronous transmission queue, information for asynchronous transmission through at least one asynchronous pipe;
- at least one guaranteed transmission queue manager configured to insert into at least one queue information for transmission through a dedicated pipe utilized by the communication system wherein the dedicated pipe differs from the at least one asynchronous pipe and from at least one isochronous pipe;
- wherein the at least one queue is selected from the at least one asynchronous transmission queue, at least one periodic transmission queue and at least one additional queue; and
- a transmitter configured to transmit information through the at least one asynchronous pipe and the dedicated pipe, wherein the transmitting through the dedicated pipe is prioritized over the transmitting at the at least one asynchronous pipe, wherein the transmitting at the dedicated pipe is irrespective of time in which information for transmission at the dedicated pipe is inserted into the at least one queue.

12. The communication system according to claim 11, further comprising at least one periodic transmission queue manager configured to queue, in at least one periodic transmission queue, information for isochronous transmission through at least one isochronous pipe; wherein the transmitter is further configured to transmit information through the at least one isochronous pipe.

13. The communication system according to claim 11, wherein the transmitter is configured to transmit at the dedicated pipe a predetermined amount of packets, irrespective of the information queued for transmission in the rest of the pipes.

14. The communication system according to claim 11, further comprising a transmission manager configured to determine a maximum count of packets that can be guaranteed for transmission in the dedicated pipe in a service interval, to inform an information source about the maximum count, wherein the at least one guaranteed transmission queue manager receives from the information source, information to be transmitted in the dedicated pipe, wherein a size of the information does not exceed the maximum count of packets per service interval.

15. The communication system according to claim 11, wherein the at least one guaranteed transmission queue manager is further configured to insert at least a part of the information for transmission at the dedicated pipe into at least one of the periodic transmission queues.

16. The communication system according to claim 11, further comprising a device descriptor analyzer configured to analyze device descriptors of received communication, and to identify prior to the inserting information for transmission at the dedicated pipe in response to a device descriptor that is different than device descriptors of isochronous pipes, of interrupt pipes, of control pipes and of bulk pipes.

17. The communication system according to claim 11, wherein the transmitter is further configured to transmit in the dedicated pipe in the periodic schedule every service interval, and to attempt to transmit all the information queued for transmission in the dedicated pipe without time-outs related to freshness of data.

18. The communication system according to claim 11, further comprising a transmission manager configured to allocate, prior to the transmitting, channel time to the at least one asynchronous pipe, to the at least one isochronous pipes, and to the dedicated pipe, wherein the allocating comprises: (a) allocating first channel time for asynchronous transmission at the at least one asynchronous pipes; (b) allocating second channel time for isochronous transmission at the at least one isochronous pipe; and (c) allocating third channel time for guaranteed periodic transmission at the dedicated pipe; wherein the allocating of the third channel time comprises allocating sufficient channel time for transmission of a predetermined amount of information;
- wherein the transmitter is further configured to transmit information at the pipes of the communication system according to a result of the allocating.

19. The communication system according to claim 18, wherein the transmission manager is further configured to prioritizing, when allocating channel time, isochronous transmission over transmission at the dedicated pipe; to reduce the maximum count of packets that can be guaranteed for transmission at the dedicated pipe if there is no sufficient channel time for minimal guaranteed isochronous transmission; and to inform an application that utilizes the dedicated pipe that the maximum count was reduced.

20. The communication system according to claim 11, wherein the at least one guaranteed transmission queue manager is further configured to insert at least a part of the information for transmission at the dedicated pipe into at least one of the asynchronous transmission queues, wherein a transmission of the at least part of the information is assigned a priority that is higher than a priority assigned to a transmission of previously queued information that was queued in the that at least one asynchronous transmission queue for bulk transmission.

21. The method according to claim 1, comprising preventing from dropping information for transmission through the dedicate pipe irrespective of time in which the information for transmission through the dedicated pipe is inserted into the at least one queue.

22. The communication system according to claim 11, arranged to prevent dropping information for transmission through the dedicate pipe irrespective of time in which the information for transmission through the dedicated pipe is inserted into the at least one queue.

* * * * *